(12) United States Patent
Chattopadhyay et al.

(10) Patent No.: US 7,440,227 B2
(45) Date of Patent: Oct. 21, 2008

(54) MAGNETIC HEAD HAVING A HALL EFFECT SENSOR AND CIRCUIT FOR DETECTING RECORDED BITS FROM MAGNETIC RECORDING MEDIA

(75) Inventors: Amitava Chattopadhyay, San Jose, CA (US); Stefan Maat, San Jose, CA (US); Ernesto E. Marinero, Saratoga, CA (US); Bruce Alvin Gurney, San Rafael, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 463 days.

(21) Appl. No.: 11/069,414

(22) Filed: Feb. 28, 2005

(65) Prior Publication Data

US 2006/0193080 A1  Aug. 31, 2006

(51) Int. Cl.
*G11B 5/37* (2006.01)
(52) U.S. Cl. ..................... 360/112
(58) Field of Classification Search .............. 360/112
See application file for complete search history.

(56) References Cited

U.S. PATENT DOCUMENTS

| | | |
|---|---|---|
| 4,129,880 A | 12/1978 | Vinal |
| 4,163,986 A | 8/1979 | Vinal |
| 4,516,144 A | 5/1985 | Jaskolski et al. |
| 4,563,696 A | 1/1986 | Jay |
| 4,939,563 A | 7/1990 | Fang et al. |
| 5,148,242 A | 9/1992 | Tsukaka et al. |
| 5,208,477 A | 5/1993 | Kub |

(Continued)

FOREIGN PATENT DOCUMENTS

GB    1243178    8/1971

(Continued)

OTHER PUBLICATIONS

M.E. Cage & C. F. Lavine, Potential and Current Distributions Calculated Across a Quantun Hall Effect Sample at Low and High Currents, Journal of Research of the National Institute of Standards and Technology, Sep.-Oct. 1995, pp. 529-541, vol. 100, No. 5, N.I.S.T., Gaithersburg, MD USA.

(Continued)

*Primary Examiner*—Craig A Renner
(74) *Attorney, Agent, or Firm*—John J. Oskorep, Esq.; Rambod Nader (57) ABSTRACT

A magnetic head has a sensor which employs the "Hall effect". In one illustrative example, the sensor includes a generally planar body made of a semiconductor heterostructure; first and second contacts comprising first and second drains, respectively, which are formed over a first end of the body and spaced equally apart from a centerline of the body; and a third contact comprising a source formed over a second end of the body which is opposite the first end of the body. The semiconductor heterostructure is comprised of a high mobility two-dimensional electron or hole gas close to an air bearing surface (ABS) of the magnetic head so as to be exposed to magnetic field lines substantially normal to it from magnetically recorded bits. Advantageously, the sensor does not require magnetic materials utilized in conventional sensors and therefore does not suffer from magnetic noise associated therewith.

37 Claims, 10 Drawing Sheets

U.S. PATENT DOCUMENTS

| | | | |
|---|---|---|---|
| 5,652,445 | A | 7/1997 | Johnson |
| 5,657,189 | A | 8/1997 | Sandhu |
| 2002/0180429 | A1 | 12/2002 | Gerber |

FOREIGN PATENT DOCUMENTS

| | | |
|---|---|---|
| JP | 02-285272 | 11/1990 |
| JP | 03-177085 | 8/1991 |

OTHER PUBLICATIONS

Miguel Calvo & Francisco Vera, Resonant Time-Dependant Magnetocurrents In a Hall Bar, Physical Review B, Jul. 31, 2001, pp. 073406-1 thru 073406-4, vol. 64, The American Physical Society.

F. M. Peeters & X. Q. Li, "Hall Magnetometer In The Ballistic Regime", Applied Physics Letters, Feb. 2, 1998, pp. 572-574, vol. 72 No. 5, American Institute of Physics.

A.K. Geim, S.V. Dubonos, J.G.S. Lok, I.V. Grigorieva, J.C. Maan, L. Theil Hansen & P.E. Lindelof, "Ballistic Hall Micromagnetometry", Applied Physics Letters, pp. 2379 & 2381, vol. 71 No. 16, American Institute of Physics.

"Semicondutor Magnetic Field Sensor "IBM Technical Disclosure Bulletin, Oct. 1975, pp. 1389-1390.

"Two Drain F.E.T. Magnetic Field Sensor", "IBM Technical Disclosure Bulletin", May 1971, p. 3633.

A. Jeffery, R.E. Elmquist & M.E. Cage, "Percision Test of a Quantum Hall Effect Device DC Equivalent Circuit Using Double-Series and Triple-Series Connections", Journal of Research of the National Institute of Standards and Technology, Nov.-Dec. 1995, pp. 677-685, vol. 100 No. 6, N.I.S.T., Gaithersburg, MD USA.

M.E. Cage, "Current Distributions in Quantum Hall Effect Devices", Journal of Research of the National Institute of Standards and Technology, Nov.-Dec. 1997, pp. 677-691, vol. 102 No. 6, N.I.S.T., Gaithersburg, MD USA.

MAGNETIC HEAD HAVING A HALL EFFECT SENSOR AND CIRCUIT FOR DETECTING RECORDED BITS FROM MAGNETIC RECORDING MEDIA

BACKGROUND

1. Field of the Technology

This invention relates generally to magnetic heads of magnetic storage devices such as disk drives, and more particularly to magnetic heads having Hall effect sensors.

2. Description of the Related Art

Magnetoresistive (MR) sensors have typically been used as read sensors in hard disk drives. An MR sensor detects magnetic field signals through the resistance changes of a read element, fabricated of a magnetic material, as a function of the strength and direction of magnetic flux being sensed by the read element. The conventional MR sensor, such as that used as a MR read head for reading data in magnetic recording disk drives, operates on the basis of the anisotropic magnetoresistive (AMR) effect of the bulk magnetic material, which is typically permalloy. A component of the read element resistance varies as the square of the cosine of the angle between the magnetization direction in the read element and the direction of sense current through the read element. Recorded data can be read from a magnetic medium, such as the disk in a disk drive, because the external field from the recorded magnetic medium (the signal field) causes a change in the direction of magnetization in the read element, which causes a change in resistance of the read element and a resulting change in the sensed current or voltage. Other types of sensors, such as GMR sensors and tunnel valve sensors, also utilize magnetic materials for operation.

Today's sensors are becoming very small, with trackwidths (TWs) approaching between about 50-200 nanometers (nm). With increasing areal densities and advancements in electron beam (e-beam) lithography, the trackwidth may shrink even below 50 nm. Given such reduced sizes, conventional sensors increasingly suffer from magnetic noise. In particular, the volume of a free layer of the sensor needs to be reduced in accordance with the trackwidth. However, a reduced volume makes the free layer magnetization more susceptible to thermal agitation, which leads to magnetic noise. Therefore, a sensor made from non-magnetic materials may be desirable for detecting small magnetic excitations such as those found in an ultrahigh-density disk drive.

Accordingly, there is a need to solve these problems so that read sensors for much larger areal recording densities may be realized for magnetic heads and other devices.

SUMMARY

A magnetic head of the present application has a sensor which employs the "Hall effect". The sensor includes a generally planar body made of a semiconductor heterostructure; first and second contacts comprising first and second drains, respectively, which are formed over a first end of the body and spaced equally apart from a centerline of the body; and a third contact comprising a source formed over a second end of the body which is opposite to the first end of the body. The semiconductor heterostructure comprises a high mobility two-dimensional electron or hole gas exposed to magnetic field lines substantially normal to it from magnetically recorded bits. Advantageously, the sensor does not require magnetic materials utilized in conventional sensors and therefore does not suffer from magnetic noise associated therewith.

BRIEF DESCRIPTION OF THE DRAWINGS

Other objects and advantages of the invention will become more apparent to those skilled in the art after considering the following detailed description in connection with the accompanying drawings.

DETAILED DESCRIPTION OF THE PREFERRED EMBODIMENTS

A magnetic head of the present application has a sensor which employs the "Hall effect". The sensor includes a generally planar body made of a semiconductor heterostructure; first and second contacts comprising first and second drains, respectively, which are formed over a first end of the body and spaced equally apart from a centerline of the body; and a third contact comprising a source formed over a second end of the body which is opposite the first end of the body. The contacts are either ohmic or low Schottky barrier contacts with low contact resistance. The semiconductor heterostructure comprises a high mobility two-dimensional (2D) electron or hole gas close to an air bearing surface (ABS) of the magnetic head so as to be exposed to magnetic field lines substantially normal to it from magnetically recorded bits. Advantageously, the sensor does not require magnetic materials utilized in conventional sensors and therefore does not suffer from magnetic noise associated therewith.

The following description is the best embodiment presently contemplated for carrying out the present invention.

This description is made for the purpose of illustrating the general principles of the present invention and is not meant to limit the inventive concepts claimed herein.

Figure 1:
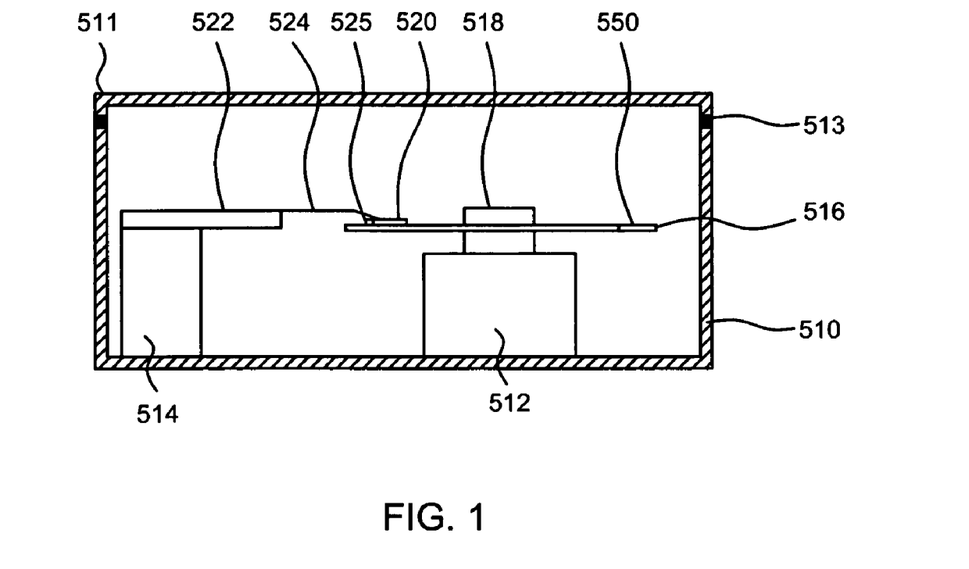
FIG. 1 is a cross-sectional view of a disk drive which may embody a magnetic head having a Hall effect sensor.
Figure 2:
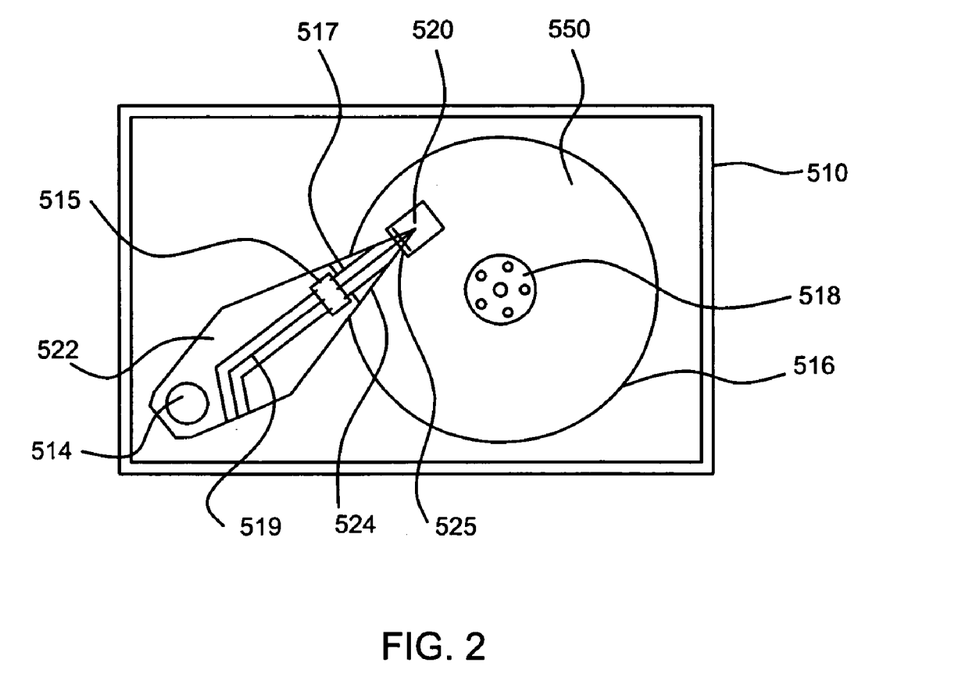
FIG. 2 is a top-down view of the disk drive of FIG. 1.

FIG. 1 is a simplified block diagram of a conventional magnetic recording disk drive having a magnetic head which includes a Hall effect sensor. FIG. 2 is a top view of the disk drive of FIG. 1 with the cover removed. Referring first to FIG. 1, there is illustrated in a sectional view a schematic of the disk drive. The disk drive comprises a base 510 to which are secured a disk drive motor 512 and an actuator 514, and a cover 511. Base 510 and cover 511 provide a substantially sealed housing for the disk drive. Typically, there is a gasket 513 located between base 510 and cover 511 and a small breather port (not shown) for equalizing pressure between the interior of the disk drive and the outside environment. A magnetic recording disk 516, which is one type of magnetic recording media, is connected to drive motor 512 by means of a hub 518 to which it is attached for rotation by drive motor 512. A thin lubricant film 550 is maintained on the surface of disk 516. A read/write head or transducer 525 is formed on the trailing end of a carrier, such as an air-bearing slider 520. Transducer 525 is a read/write head comprising an inductive write head portion and a read head portion. Slider 520 is connected to actuator 514 by means of a rigid arm 522 and a suspension 524. Suspension 524 provides a biasing force which urges slider 520 onto the surface of the recording disk 516. During operation of the disk drive, drive motor 512 rotates disk 516 at a constant speed, and actuator 514, which is typically a linear or rotary voice coil motor (VCM), moves slider 520 generally radially across the surface of disk 516 so that read/write head 525 may access different data tracks on disk 516.

FIG. 2 illustrates in better detail suspension 524 which provides a force to slider 520 to urge it toward disk 516. Suspension 524 may be a conventional type of suspension, such as the well-known Watrous suspension, as described in U.S. Pat. No. 4,167,765. This type of suspension also provides a gimbaled attachment of the slider which allows the slider to pitch and roll as it rides on the air bearing surface. The data detected from disk 516 by transducer 525 is processed into a data readback signal by signal amplification and processing circuitry in an integrated circuit chip 515 located on arm 522. The signals from transducer 525 travel via a flex cable 517 to chip 515, which sends its output signals to the disk drive electronics (not shown) via cable 519.

Figure 3A:
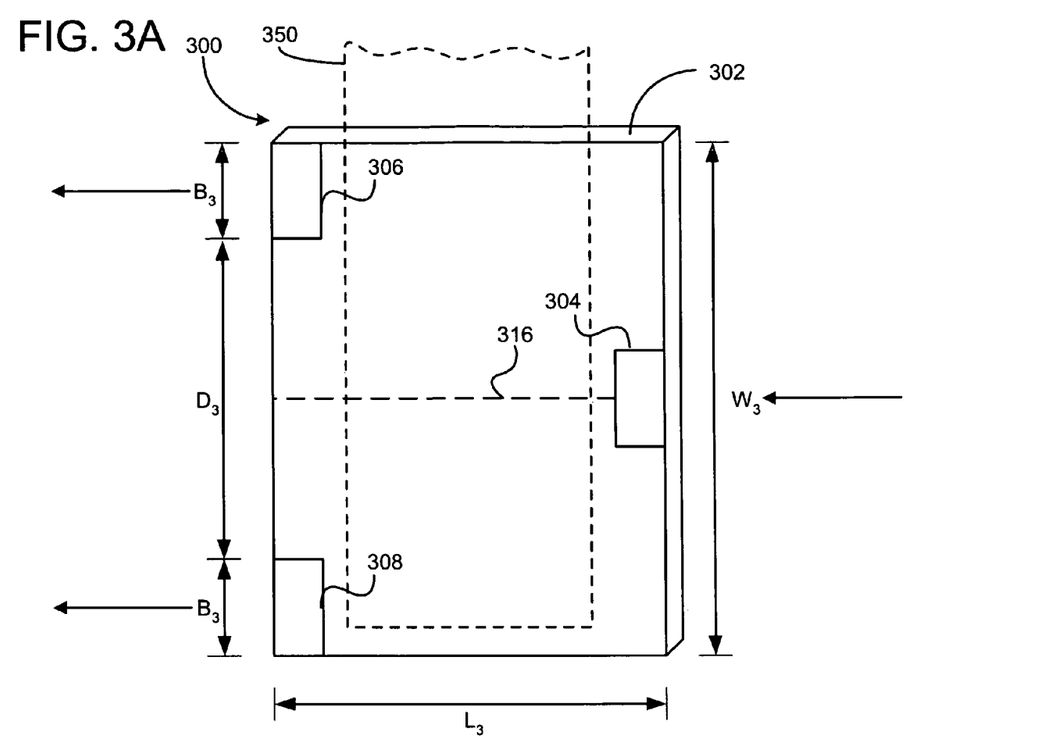
FIG. 3A is an elevational view of the Hall effect sensor of the magnetic head, where the sensor has a semiconductor body, a first contact comprising a first drain, a second contact comprising a second drain, and a third contact comprising a source.

FIG. 3A is an elevational view of a Hall effect sensor 300 of the magnetic head of the present application. Sensor 300 is utilized in the magnetic head and disk drive shown and described in relation to FIGS. 1 and 2. As shown in FIG. 3A, Hall effect sensor 300 includes a body 302, a source 304, a first drain 306, and a second drain 308. In general, body 302 is made of a semiconductor heterostructure forming a 2D electron or hole gas with high electron or hole mobility. Narrow band-gap semiconductors typically exhibit high electron mobility, since the effective electron mass is greatly reduced. Typical narrow band-gap materials are Indium Antimonide (InSb) and Indium Arsenide (InAs). For example, the room temperature electron mobility of InSb and InAs are ~70,000 cm$^2$/Vs and ~35,000 cm$^2$/Vs, respectively.

Figure 3B:
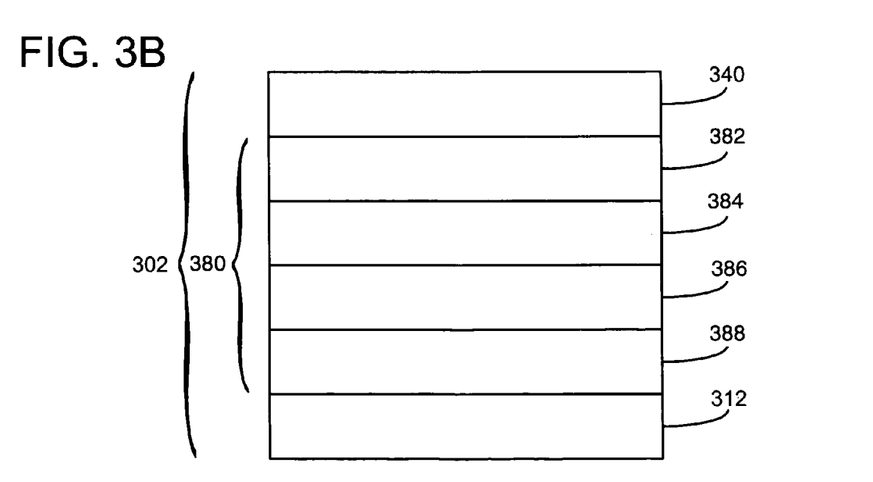
FIG. 3B illustrates a heterostructure of the Hall effect sensor of FIG. 3A.

In FIG. 3B, heterostructure 380 of the body 302 of FIG. 3A is illustrated in cross-section. Heterostructure 380 of FIG. 3B may be an III-V heterostructure formed on a semiconducting substrate 312, such as Gallium Arsenide (GaAs). However, the Hall effect sensor of the magnetic head described herein is not restricted to III-V semiconductor materials. It may alternatively be formed, for example, on the basis of silicon (Si) as well as germanium (Ge). As illustrated, heterostructure 380 is a mesa above substrate 312 that results from a subtractive process, such as reactive-ion-etching (RIE). Heterostructure 380 has a quantum well that includes a first layer 386 of semiconducting material having a first band gap, a second layer 384 of semiconducting material formed on top of first layer 386 and having a second band gap smaller than the first band gap, and a third layer 382 of semiconducting material formed on top of second layer 384 and having a third band gap greater than the second band gap. The materials in first and third layers 386 and 382 may be similar or identical. An energetic potential well (quantum well) is created by the first, second and third semiconducting material layers due to the different band-gaps of the different materials. Thus carriers can be confined inside layer 384.

First layer 386 is typically formed on top of a buffer layer 388 that may be one or more layers. Buffer layer 388 typically comprises several periods of a superlattice structure that function to prevent impurities present in the substrate from migrating into the functional layers 386, 384 and 382. In addition, buffer layer 388 is chosen to accommodate the typically different lattice constants of substrate 312 and the functional layers of hetero structure 380 to thus act as a strain relief layer between the substrate and the functional layers. One or more doped layers are incorporated into the semiconducting material in first layer 386, third layer 382, or both, and spaced apart from a boundary of first and second and a boundary of second and third semiconducting materials. The doped layers provide electrons (if n-doped) or holes if (p-doped) to the quantum well. The electrons or holes are concentrated in the quantum well in the form of a 2D electron or hole gas, respectively.

A capping layer 340 is formed over the heterostructure 380 to protect the device from corrosion. Capping layer 340 is formed of an insulating material such as oxides or nitrides of aluminum (Al) or Si (e.g., $Si_3N_4$, $Al_2O_3$) or a non-corrosive semi-insulating semiconductor. For example, an InAs quantum well may be utilized, where second layer 384 may be a 5-20 nm thick layer of InAs, first layer 386 may be a 5-10 nm thick layer of Aluminum Antimonide (AlSb), third layer 382 may be a 5-10 nm thick layer of AlSb. The delta doped layer may be Si or tellurium (Te) (n-doped) in third layer 382 about 2 nm away from the interface of second and third layer. The cap may be formed of $In_{0.5}Al_{0.5}As$ or other suitable cap materials. It is to be understood that the thicknesses and materials of this example are used for illustrative purposes only and is not meant to limit the inventive concepts claimed herein.

Referring back to FIG. 3A, body 302 is generally planar and rectangular in shape. However, other suitable shapes may be utilized for body 302. As indicated in FIG. 3A, rectangular body 302 has a length $L_3$ and a width $W_3$. Source 304 is preferably an ohmic contact with the 2D electron gas formed over a first end of the body 302. In the present embodiment, Hall effect sensor 300 is void of having any gate. In addition, a first drain 306 and a second drain 308 preferably are ohmic contacts with the 2D electron gas which are formed over a second end of the body 302 which is opposite the first end. Alternatively, the contacts may be low Schottky barrier height contacts. Drains 306 and 308 are spaced a distance $D_3$ apart from each other and a distance $D_3/2$ from a centerline 316 of the body 302 as shown. The width of each drain is $B_3$, so that $D_3+2B_3$ is equal to or less than $W_3$.

The ohmic contacts may be formed according to well known procedures in the literature. The most common approach, for example, for fabricating ohmic contacts on GaAs or other III-V semiconductors (e.g. InSb or InAs) applies an appropriate metallization to the wafer in a desired pattern and then alloy the metal into the III-V semiconductor by rapid thermal annealing. During the process, a component of the metal enters into the III-V semiconductor and highly dopes the surface layer. Candidate species for doping are Si, Ge, tin (Sn), and Te for n-type and zinc (Zn), cadmium (Cd), beryllium (Be), and magnesium (Mg) for p-type III-V materials. Gold (Au) and Au alloys, preferably a Gold Germanium (AuGe) or Gold Tin (AuSn) alloy, are the most common and preferred materials for ohmic contact fabrication on n-type materials. A typical contact resistance area product for an ohmic contact is in the range of 1E-7 to 1E-6 Ohm·cm².

If AuGe is utilized to make contact to an n-type semiconductor (an electron gas), it is applied in proportions that represent an eutectic alloy (88% Au and 12% Ge by weight). This eutectic melts at 360° C. and thus any thermal annealing is carried out at temperatures exceeding 360° C. Other elements may be added to wet the alloy and prevent it from clustering up during the annealing process. Nickel (Ni), silver (Ag), or lutetium (Lu) are common choices of wetting agents for AuGe and may be either added to the alloy or applied before or after applying the AuGe layer. Ni is also known to enhance the diffusivity of Ge or other dopants into the III-V semiconductor. The resulting contact after annealing is then an alloy comprising AuGeX, where X=Ni, Ag, or Lu.

The contact metal may be applied by electron beam (e-beam) or thermal evaporation, sputtering, or other common thin film techniques known in the semiconductor industry. The wetting layer of Ni, Ag, or Lu may also be deposited by e-beam evaporation, thermal evaporation or sputtering. Approximately 25-30 nm of Ni are used for every 100 nm of AuGe. The exact thickness of the AuGe is not critical; however, 50-250 nm is preferred. Much thinner layers of AuGe will typically result in higher contact resistance. Alloyed AuGeX (X=Ni, Ge, or Lu) generally has poor sheet resistance and thus an extra layer of Au may be added on top of the lead structures to form a AuGeX/Au multilayer with a reduced lead sheet resistance. In addition to Au as one of the layers in the multilayer structure, other materials may be used to lower lead sheet resistance, including copper (Cu), Ag, platinum (Pt), or palladium (Pd).

Another example of forming contacts is to deposit lead material directly onto exposed edges of heterostructure 380 after the mesa has been formed. Source 304 and drain 306 and 308 contacts are formed either by deposition of lead material through shadow masks or other well-known photolithographic patterning techniques such as wet or dry etching, milling or lift-off.

Figure 3C:
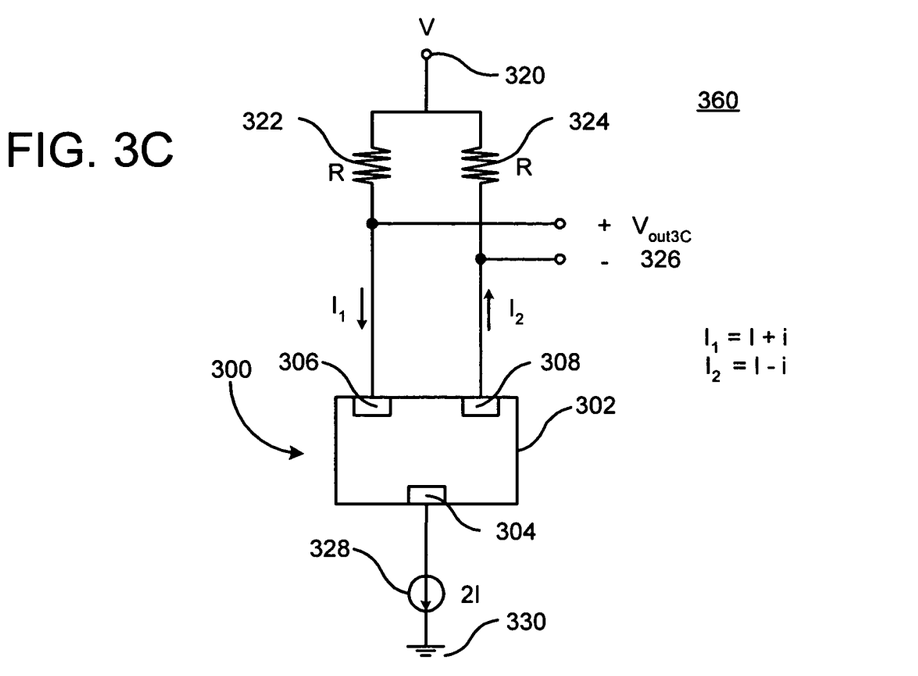
FIG. 3C is a schematic diagram of an electrical circuit having the Hall effect sensor of the magnetic head.
Figure 3D:
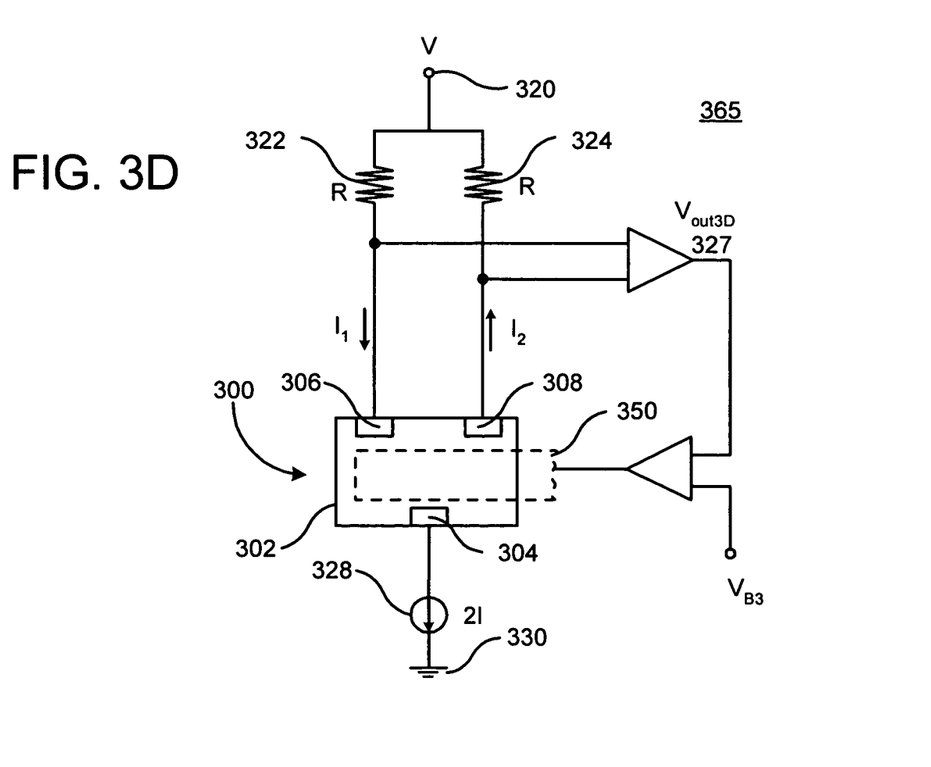
FIG. 3D is a schematic diagram of an alternative electrical circuit having the Hall effect sensor which further includes a gate.
Figure 3E:
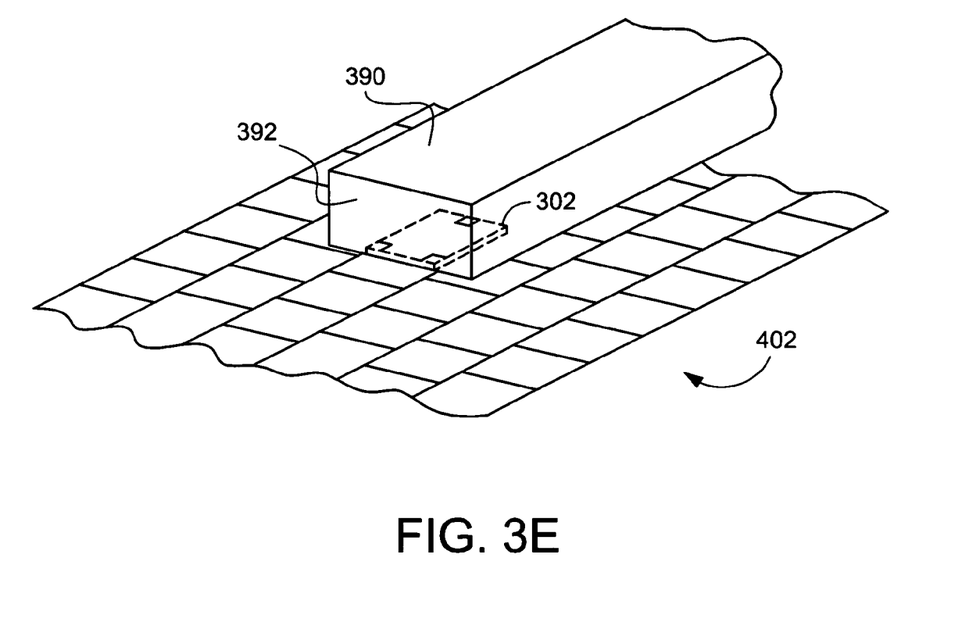
FIG. 3E is an illustration of a portion of a slider which carries the magnetic head having the Hall effect sensor on its bottom side with the planes of the heterostructure being parallel to the magnetic disk.
Figure 3F:
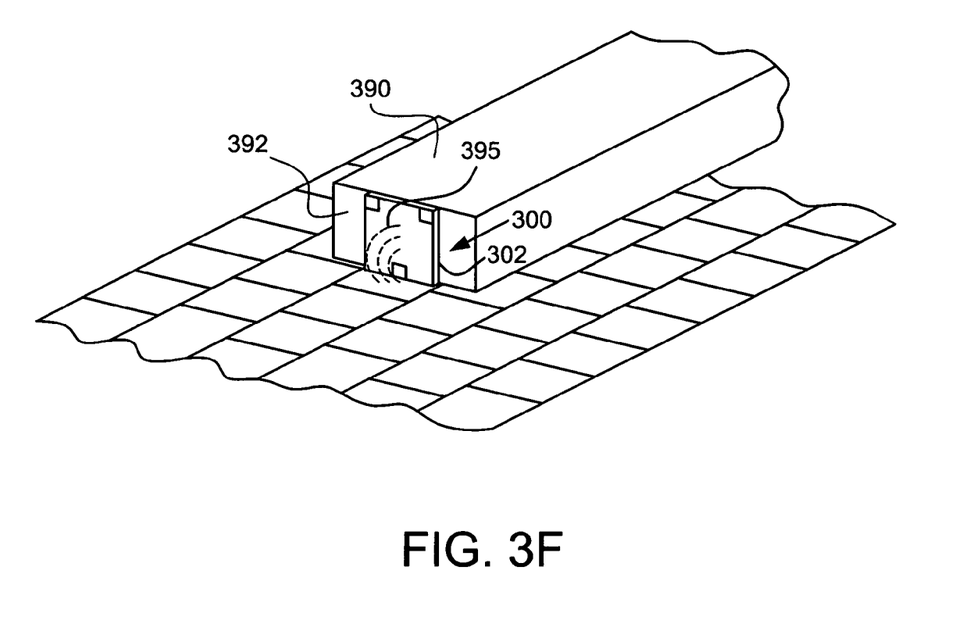
FIG. 3F is an illustration of a portion of a slider which carries the magnetic head having the Hall effect sensor on its tail end with planes of the heterostructure being perpendicular to a magnetic disk.

Referring ahead to FIGS. 3E and 3F, illustrations of a portion of a slider 390 which carries the magnetic head having the magnetic Hall effect sensor 300 of FIG. 3A are shown. In particular, sensor 300 is carried on slider 390 such that body 302 is exposed to magnetic field signals 395 from a magnetic disk 402 which are substantially normal to the planes of the semiconductor heterostructure.

In a first variation shown in FIG. 3E, the 2D electron or hole gas is oriented substantially parallel to the surface of the disk. For longitudinally recorded bits, the field lines above a bit transition are sensed. For perpendicular recorded bits, the field lines above a magnetic bit are sensed. Hall effect sensor 300 is carried on slider 390 so that the top surface of body 302 is exposed at an air bearing surface (ABS) of the magnetic head. The body may be oriented such that the source and drains are in the downtrack direction or, alternatively, in the cross-track direction. In the former case, distance $D_3$ is equal to or less than the trackwidth on the disk and distance $L_3$ is equal to or less than the bit length on the disc. Thus, distance $D_3$ may be between about 50-200 nm. In the latter case, distance $L_3$ is equal to or less than the trackwidth on the disk and distance $D_3$ is equal to or less than the bit length on the disk. Thus, distance $L_3$ may be between about 50-200 nm. Generally the 2D electron or hole gas should be as close as possible to the magnetic fields from the disk to obtain high sensitivity. Accordingly, body 302 is mounted on a bottom side of slider 390 in such a way that, the cap layer is positioned closest to the disk and the substrate is located furthest from the disk. Compare the mounting of body 302 on the bottom side of slider 390 in FIG. 3E to the mounting of body 302 on a tail end 392 of slider 390 in FIG. 3F. However, the thickness of third semiconducting material and cap will have an impact on mobility of the 2D electron or hole gas and spacing loss. The thinner the third semiconducting material and cap is, the closer the 2D electron or hole gas may be brought to the disk which results in higher magnetic fields penetrating the 2D electron or hole gas. However, below some critical thickness of the third semiconducting material, the mobility of the 2D electron or hole gas will decrease. Accordingly, there is an optimum thickness for the third semiconducting material to obtain the highest possible sensitivity.

In a second variation shown in FIG. 3F, the 2D electron or hole gas is oriented substantially perpendicular to the plane of the disk. For longitudinally recorded bits, the field lines above a bit are sensed. For perpendicular recorded bits, the field lines above a bit transition are sensed. For this second variation, the width of the quantum well is equal to or less than the bit length on the disk. Hall effect sensor 300 is carried on tail end 392 of slider 390 so that either side of the body 302 is exposed at an air bearing surface (ABS) of the magnetic head. Preferably, the first or the second end of body 302 is exposed at the ABS so that distance $D_3$ is equal to or less than the trackwidth on the disk. Thus, distance $D_3$ may be between about 50-200 nm. In addition, either side of body 302 may be exposed at the ABS such that length $L_3$ of body 302 is equal to or less than the trackwidth. Thus, the length $L_3$ may be between about 50-200 nm.

Referring now to FIG. 3C, a schematic diagram of an exemplary electrical circuit 360 which includes magnetic Hall effect sensor 300 of FIG. 3A is shown. Electrical circuit 360 also includes a fixed current source 328, voltage references 320 and 330, and resistors 322 and 324. Although sensor 300 is provided on a slider of the disk drive, some or all of the remaining components of electrical circuit 360 may be included within arms electronics (AE) of the disk drive which is separate and apart from the slider. Also note that electrical circuit 360 is but just one example of suitable circuitry for sensor 300.

In FIG. 3C, fixed current source 328 is coupled between source 304 and voltage reference 330 (e.g. ground) and provides a current 2I. Voltage reference 320 (e.g. V+) is coupled to drain 306 through resistor 322 and to drain 308 through resistor 324. An output 326 ($V_{out3C}$) of electrical circuit 360 is provided as the voltage difference between drains 306 and 308. Preferably, resistances (designated as "R" in FIG. 3C) of resistors 322 and 324 are substantially the same. A current $I_1=I+i$ flows through drain 306 and a current $I_2=I-i$ flows through drain 308, where i is the change in the current due to magnetic field signals penetrating the sensor substantially normal to a direction of the current.

Figure 4:
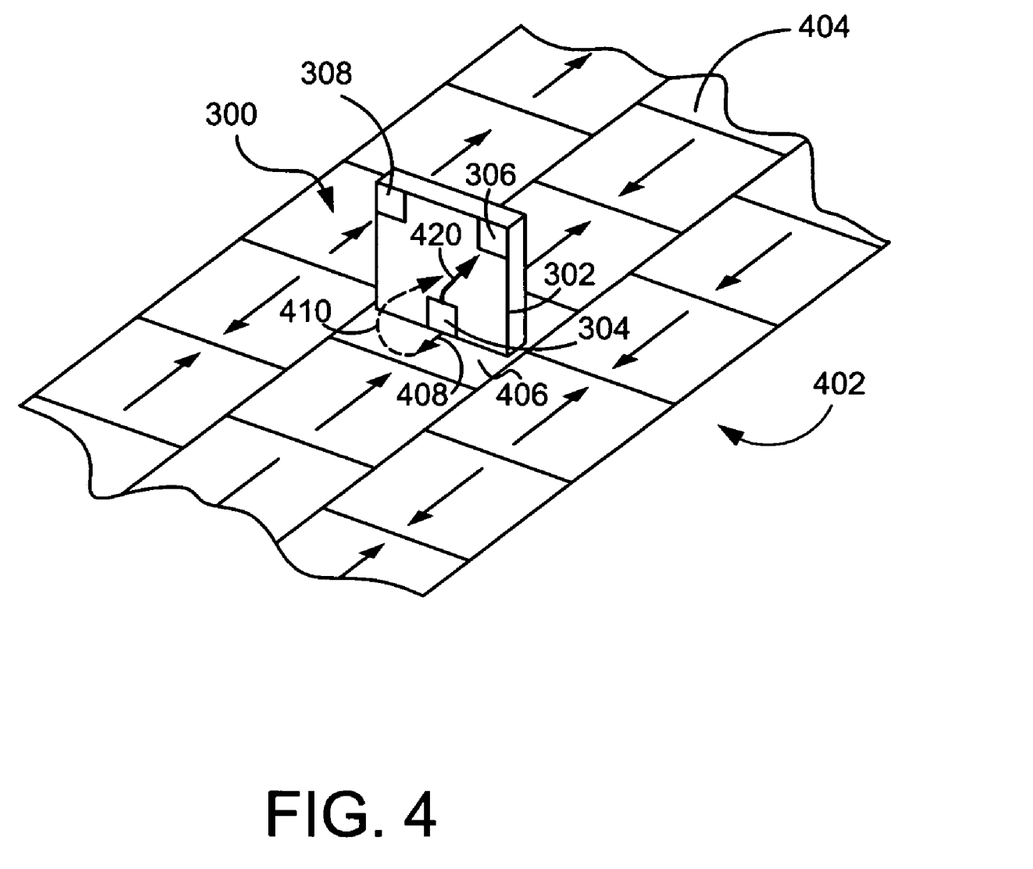
FIG. 4 is an illustrative representation of sensor operation when the Hall effect sensor is exposed to magnetic field signals in a first direction from the magnetic disk.

Carriers (electrons or holes) enter the device through one electrode (i.e. source 304) and exit the device through two electrodes (i.e. drains 306 and 308). The magnetic field signals originating from the recorded bits penetrate the body 302. In a "zero field", the current exiting the device is the same at both drains 306 and 308 (i=0). Referring to FIG. 4, when a magnetic field 410 is applied in a first direction at right angles into the plane of body 302, a trajectory 420 of electrons (holes) is bent by what is referred to as the "Lorentz Force" toward drain 306 (308) as shown. This magnetic field 410 originates from a recorded bit 408 representing a digital '0' or '1' at a location 406 on a disk track 404 of the magnetic disk. In this case, current flow through drain 306 is greater than that through drain 308.

Figure 5:
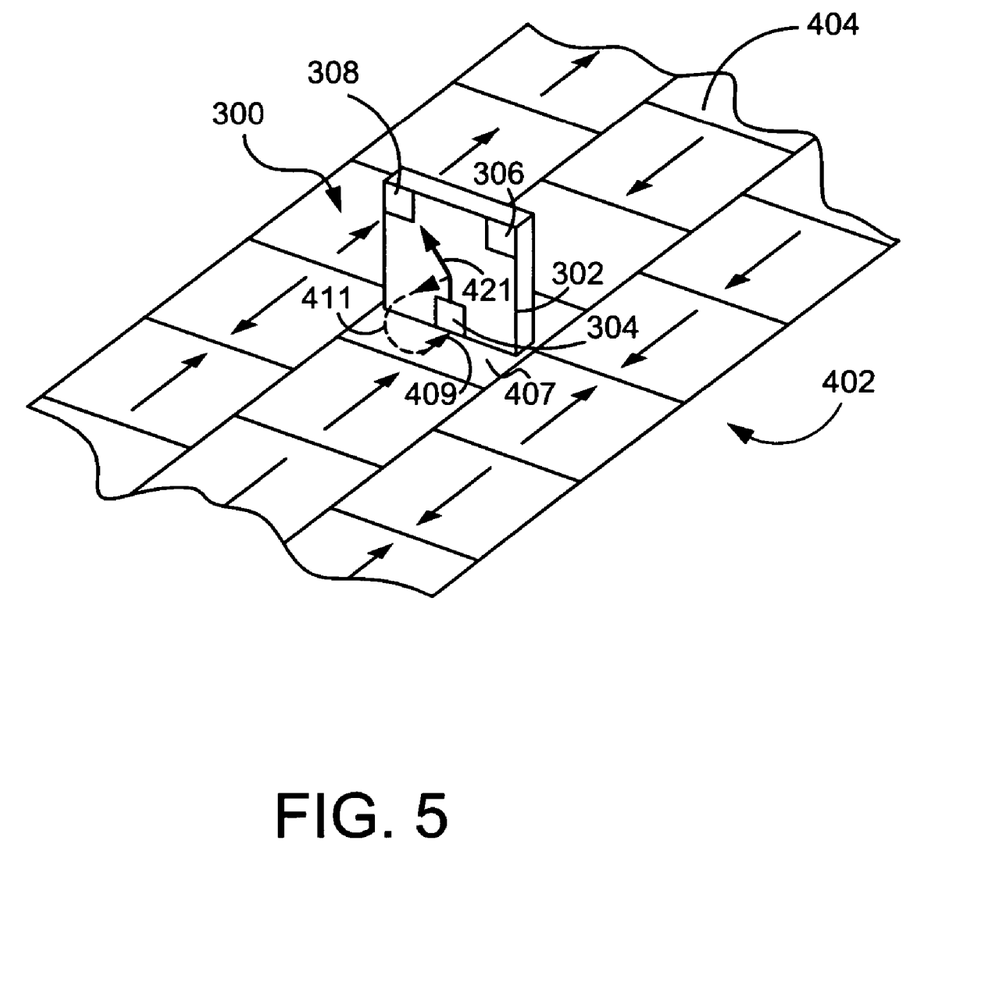
FIG. 5 is another illustrative representation of sensor operation when the Hall effect sensor is exposed to magnetic field signals in a second direction from the magnetic disk.

The Lorentz Force is given by the relation $$F=qv\times B \qquad \text{(Equation 1)}$$

where F is the Lorentz force, q is the electric charge of the carriers in the 2D electron or hole gas, v is the velocity vector of the carriers, and B is the magnetic flux density vector penetrating the 2D electron or hole gas. Carriers will be accelerated in a direction perpendicular to both the carrier velocity and the flux density as determined by the right hand rule. However due to scattering, electrons are not moving in circular trajectories, but move at a Hall angle α defined by $$\tan(\alpha)=\mu*B \qquad \text{(Equation 2)}$$

where μ is the mobility of the electron or hole gas in the body 302. Referring to FIG. 5, when a magnetic field 411 is applied in a second direction opposite the first direction at right angles into the plane of body 302, a trajectory 421 of electrons (holes) is bent toward drain 308 (306) as shown. This magnetic field 411 originates from a recorded bit 409, opposite in polarity of that of magnetic field 410 in FIG. 4, representing a digital '0' or '1' at a location 407 on disk track 404 of the magnetic disk. In this case, current flow through drain 308 is greater than that through drain 306.

In either case of FIGS. 4 and 5, the differential current i is proportional to the magnetic field penetrating the 2D electron or hole gas. The current can be characterized by:

$$i=G*\mu*B*I \qquad \text{(Equation 3)}$$

where G is a geometry factor and I is the current flowing through the sensor. This differential current i is translated into a differential voltage dV which is read by the processing circuitry of the disk drive.

Figure 6:
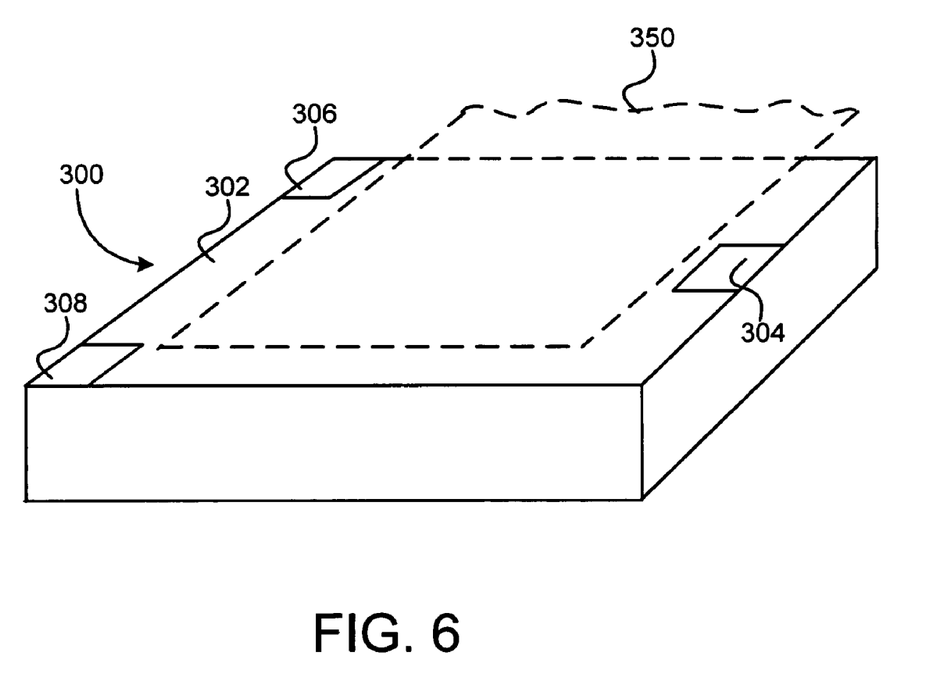
FIG. 6 is a perspective view of the Hall effect sensor having a gate layer formed thereover.

In another embodiment, Hall effect sensor 300 has a gate 350 as revealed in dashed lines of FIGS. 3A and 6. As shown, gate 350 is in contact with body 302 without making contact with source 304 and drains 306 and 308. In this case, an electrical circuit 365 of FIG. 3D may be utilized. A portion of a differential output signal 327 ($V_{out3D}$) from drains 306 and 308 together with a suitable bias voltage $V_{B3}$ is fed back to gate 350. The feedback to gate 350 is negative. Negative feedback generally results in improved sensor linearity as well as consistent amplification across the sensor bandwidth.

Figure 7:
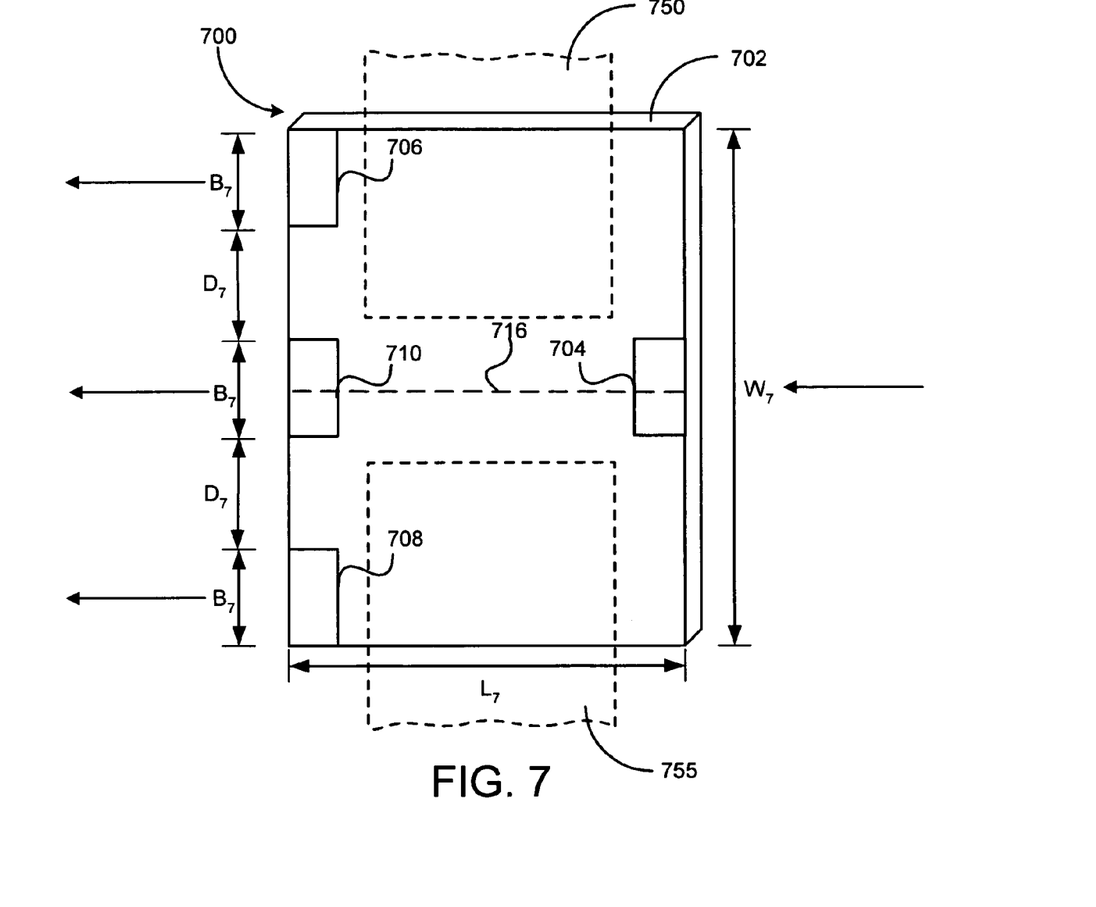
FIG. 7 is a variation of the Hall effect sensor having three drains and two gates formed thereover.

FIG. 7 is an elevational view of a Hall effect sensor 700, a variation of Hall effect sensor 300 previously described above. In general, sensor 700 is the same as that shown and described in relation to sensor 300 above, except that a fourth contact (third drain 710) is formed over a body 702 at a centerline 716 and is flanked by drains 706 and 708. Sensor 700 is utilized in the magnetic head and disk drive shown and described in relation to FIGS. 1 and 2. Furthermore, body 702 has a length $L_7$ and a width $W_7$. In addition, drains 706, 708, and 710 have a width $B_7$ and are spaced a distance $D_7$ apart from each other. Drain 710 extends a distance $B_7/2$ above and below centerline 716. Furthermore, drains 706 and 708 are spaced a distance $B_7/2+D_7$ from centerline 716 of the body 702 as shown. The distance $D_7$ and the width $B_7$ are chosen so $D_7$ is equal to or less than the trackwidth of the sensor and $2D_7+3B_7$ is equal to or less than $W_7$. In this case, two adjacent tracks can be read simultaneously.

Figure 8:
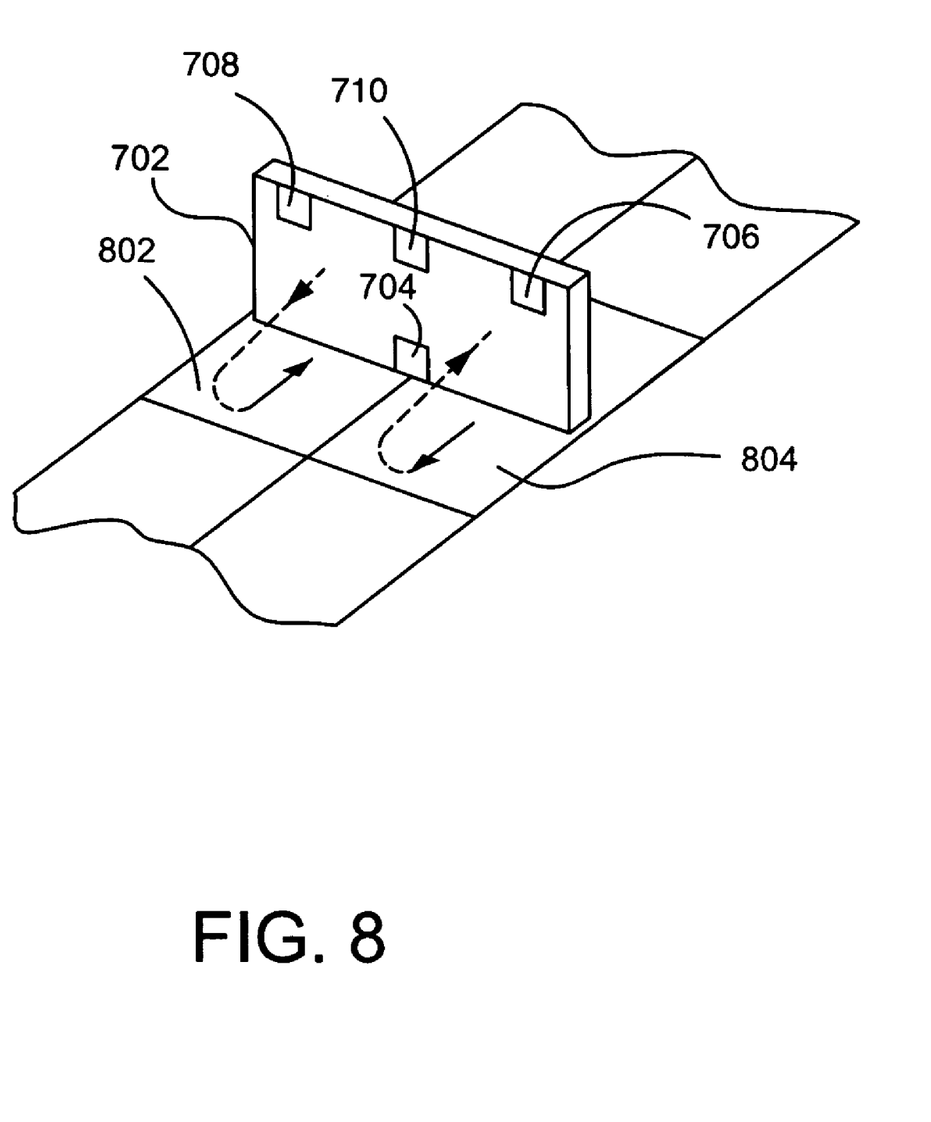
FIG. 8 is an alternative embodiment of the Hall effect sensor of the magnetic head, which is configured to read two tracks of the magnetic disk at substantially the same time.

In the present embodiment, sensor 700 is void of having any gate. In this variation, an output signal is taken as the difference in voltage between drains 706 and 710, as well as, drains 708 and 710. Additional drains are also realizable with additional output signals taken as the difference in voltage between neighboring drains. Hall effect sensor 700 may be mounted such that the 2D electron gas is substantially parallel or perpendicular to the surface of the disk. In the former case, the drains need to be on either side of the down-track direction of the head; in the latter case, the drains need to be at the ABS side or the side opposite to the ABS. FIG. 8 shows this variation with the sensor 700 such that the 2D electron gas is perpendicular to the disk, and the body 702 of the sensor is sufficiently sized and configured to read two tracks 802 and 804 of the disk simultaneously.

In another embodiment, Hall effect sensor 700 has two gates 750 and 755 as revealed in the dashed lines of FIG. 7. As shown, gates 750 and 755 are in contact with body 702 without making contact with source 704 and drains 706, 708, or 710. In this case, a variation of an electrical circuit 365 of FIG. 3D may be utilized. A portion of a differential output signal between drain 706 and 708 together with a suitable bias voltage is fed back to gate 755. Further, a portion of a differential output signal between drain 710 and 708 together with a suitable bias voltage is fed back to gate 750. The feedback to each gate is negative. Negative feedback generally results in improved sensor linearity as well as consistent amplification across the sensor bandwidth.

As described, a magnetic head has a sensor which includes a generally planar body made of a semiconductor heterostructure; first and second contacts comprising first and second drains which are formed over a first end of the body and spaced equally apart from a centerline of the body; and a third contact comprising a source formed over a second end of the body which is opposite the first end of the body. The semiconductor heterostructure is comprised of a high mobility 2D electron or hole gas close to the ABS so as to be exposed to magnetic field lines substantially normal to it. Advantageously, the sensor does not require magnetic materials utilized in conventional sensors and therefore does not suffer from the magnetic noise associated therewith.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special particular meaning different from the plain language meaning to those ordinarily skilled in the art, and therefore the specification is not to be used to define terms in an unduly narrow sense.

The invention claimed is:

1. A magnetic head having a Hall effect sensor comprising:
   a generally planar body made of a semiconductor heterostructure;
   a first contact comprising a first drain formed over a first end of the body;
   a second contact comprising a second drain formed over the first end of the body;
   the first and the second contacts being spaced equally apart from a centerline of the body;
   a third contact comprising a source formed over a second end of the body which is opposite the first end of the body;
   the Hall effect sensor being carried by the magnetic head at an air bearing surface (ABS), such that the body is exposed to magnetic field signals substantially normal thereto from magnetic recording media which has a plurality of recorded bits with at least one of a first bit polarity and a second bit polarity;

a first resistor coupled between a reference voltage and the first contact;

a second resistor coupled between the reference voltage and the second contact;

a current source coupled to the third contact and adapted to produce a current 2I through the body, such that the first drain has a first current $I_1=I-i$ and the second drain has a second current $I_2=I+i$, where i is a differential current which varies based on whether the magnetic field signals correspond to a recorded bit having the first bit polarity or the second bit polarity; and a voltage output taken between the first and the second contacts and providing a differential voltage which varies based on whether the magnetic field signals correspond to a recorded bit having the first bit polarity or the second bit polarity.

2. The magnetic head of claim 1, wherein the Hall effect sensor is void of having any gate.

3. The magnetic head of claim 1, wherein the body further comprises a two-dimensional electron or hole gas.

4. The magnetic head of claim 3, wherein an ohmic contact is formed between the two-dimensional electron or hole gas and one of the source, the first drain, and the second drain.

5. The magnetic head of claim 3, wherein the semiconductor heterostructure comprises one of Indium Arsenide (InAs), Indium Antimonide (InSb), and an alloy of indium (In), arsenic (As), and antimony (Sb).

6. The magnetic head of claim 1, further comprising:
a fourth contact comprising a gate formed over the body.

7. The magnetic head of claim 6, wherein a portion of an output signal from the first drain and the second drain is fed back to the gate.

8. The magnetic head of claim 1, wherein a distance between the first drain and the second drain is equal to or less than a trackwidth or a bit length of the media.

9. The magnetic head of claim 1, further comprising:
a fourth contact comprising a third drain formed at a centerline over the first end of the body.

10. The magnetic head of claim 9, wherein the Hall effect sensor is void of having any gate.

11. The magnetic head of claim 9, wherein the body further comprises a two-dimensional electron or hole gas.

12. The magnetic head of claim 9, further comprising:
a fifth contact comprising a first gate formed over the body; and
a sixth contact comprising a second gate formed over the body.

13. The magnetic head of claim 12, wherein a portion of an output signal from the first drain and the third drain is fed back to the first gate and a portion of an output signal from the second drain and the third drain is fed back to the second gate.

14. The magnetic head of claim 9, wherein a distance between the drains are such that two tracks of the media can be read simultaneously.

15. The magnetic head of claim 1, wherein the first and the second resistors have first and second resistances which are substantially the same.

16. The magnetic head of claim 1, wherein the first and the second bit polarities correspond to recorded bits '0' and '1'.

17. The magnetic head of claim 1, wherein i is further characterized by the relation:

$$i=G*\mu*B*I$$

where:
G is a geometry factor of the body;
μ is a mobility of an electron or hole gas in the body; and
B is a magnetic flux density vector associated with penetrating the electron or hole gas in the body.

18. A disk drive, comprising:
a slider;
a magnetic head carried on the slider;
a read head portion of the magnetic head;
the read head portion including a Hall effect sensor;
the Hall effect sensor having:
a generally planar body made of a semiconductor heterostructure;
a first contact comprising a first drain formed over a first end of the body;
a second contact comprising a second drain formed over the first end of the body;
the first and the second contacts being spaced equally apart from a centerline of the body;
a third contact comprising a source formed over a second end of the body which is opposite the first end of the body;
the Hall effect sensor being carried by the slider at an air bearing surface (ABS), such that the body is exposed to magnetic field signals substantially normal thereto from a magnetic disk which has a plurality of recorded bits with at least one of a first bit polarity and a second bit polarity;
a first resistor coupled between a reference voltage and the first contact;
a second resistor coupled between the reference voltage and the second contact;
a current source coupled to the third contact and adapted to produce a current 2I through the body, such that the first drain has a first current $I_1=I-i$ and the second drain has a second current $I_2=I+i$, where i is a differential current which varies based on whether the magnetic field signals correspond to a recorded bit having the first bit polarity or the second bit polarity; and
a voltage output taken between the first and the second contacts and providing a differential voltage which varies based on whether the magnetic field signals correspond to a recorded bit having the first bit polarity or the second bit polarity.

19. The disk drive of claim 18, wherein the Hall effect sensor is void of having any gate.

20. The disk drive of claim 18, wherein the body further comprises a two-dimensional electron or hole gas.

21. The disk drive of claim 20, wherein an ohmic contact is formed between the two-dimensional electron or hole gas and one of the source, the first drain, and the second drain.

22. The disk drive of claim 20, wherein the heterostructure comprises one of Indium Arsenide (InAs), Indium Antimonide (InSb), and an alloy of indium (In), arsenic (As), and antimony (Sb).

23. The disk drive of claim 18, further comprising:
a fourth contact comprising a gate formed over the body.

24. The disk drive of claim 23, wherein a portion of an output signal from the first drain and the second drain is fed back to the gate.

25. The disk drive of claim 18, wherein a distance between the first drain and the second drain is equal to or less than a trackwidth or a bit length of the magnetic disk.

26. The disk drive of claim 18, further comprising:
a fourth contact comprising a third drain formed at a centerline over the first end of the body.

27. The disk drive of claim 26, wherein the Hall effect sensor is void of having any gate.

28. The disk drive of claim 26, wherein the body further comprises a two-dimensional electron or hole gas.

29. The disk drive of claim 26, further comprising:
- a fifth contact comprising a first gate formed over the body; and
- a sixth contact comprising a second gate formed over the body.

30. The disk drive of claim 29, wherein a portion of an output signal from the first drain and the third drain is fed back to the first gate and a portion of an output signal from the second drain and the third drain is fed back to the second gate.

31. The disk drive of claim 26, wherein a distance between the drains are such that two tracks of the magnetic disk can be read simultaneously.

32. The disk drive of claim 18, wherein the body comprises a generally planar rectangular body.

33. The disk drive of claim 18, wherein the first and the second resistors have first and second resistances which are substantially the same.

34. The disk drive of claim 18, wherein the first and the second bit polarities correspond to recorded bits '0' and '1'.

35. The disk drive of claim 18, wherein i is further characterized by the relation:

$$i = G * \mu * B * I$$

where:
- G is a geometry factor of the body;
- μ is a mobility of an electron or hole gas in the body; and
- B is a magnetic flux density vector associated with penetrating the electron or hole gas in the body.

36. The disk drive of claim 18, wherein the Hall effect sensor is carried on a tail end of the slider.

37. The disk drive of claim 18, wherein the Hall effect sensor is carried on a bottom end of the slider.

* * * * *